United States Patent Office 3,561,841
Patented Feb. 9, 1971

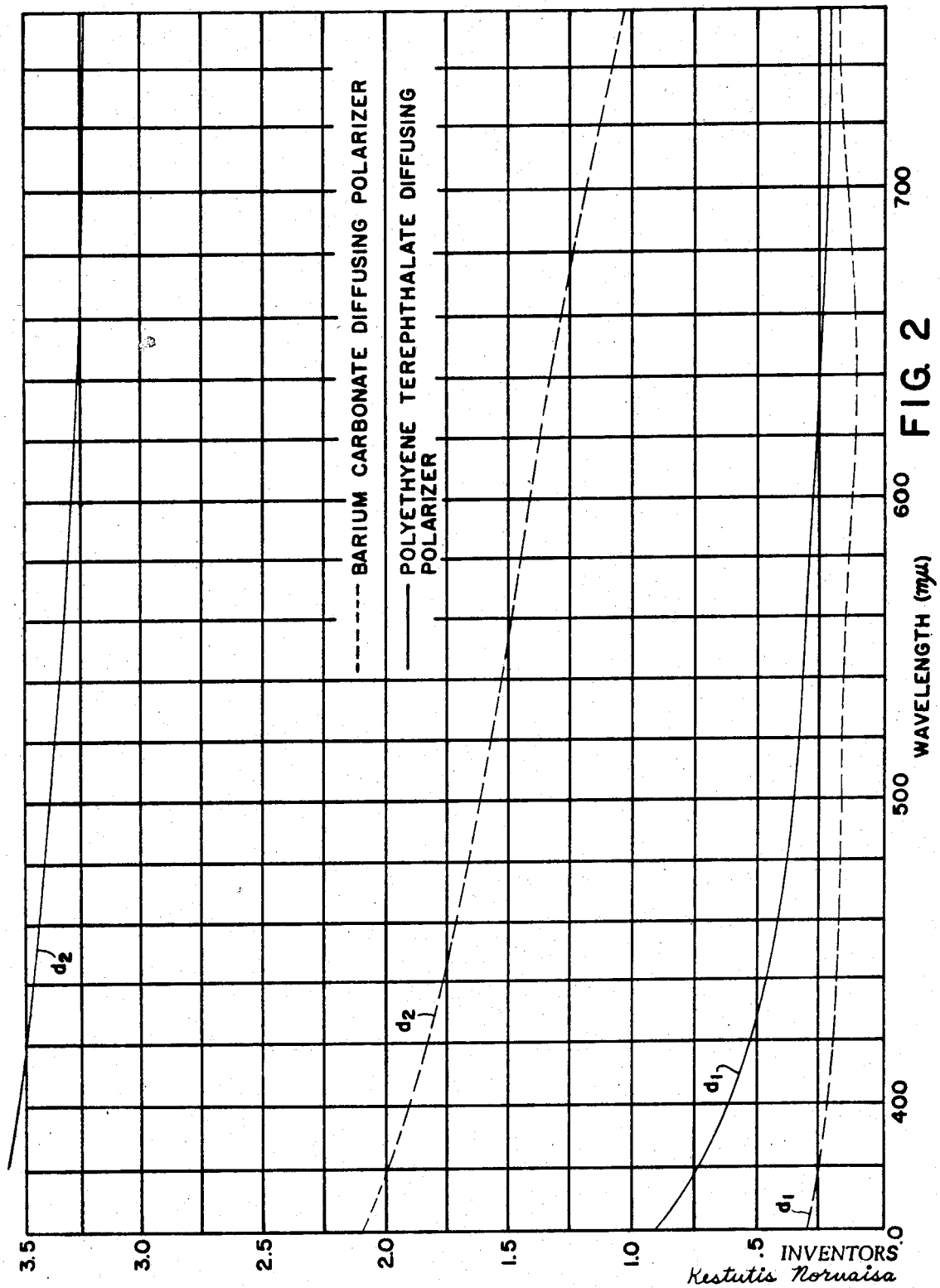

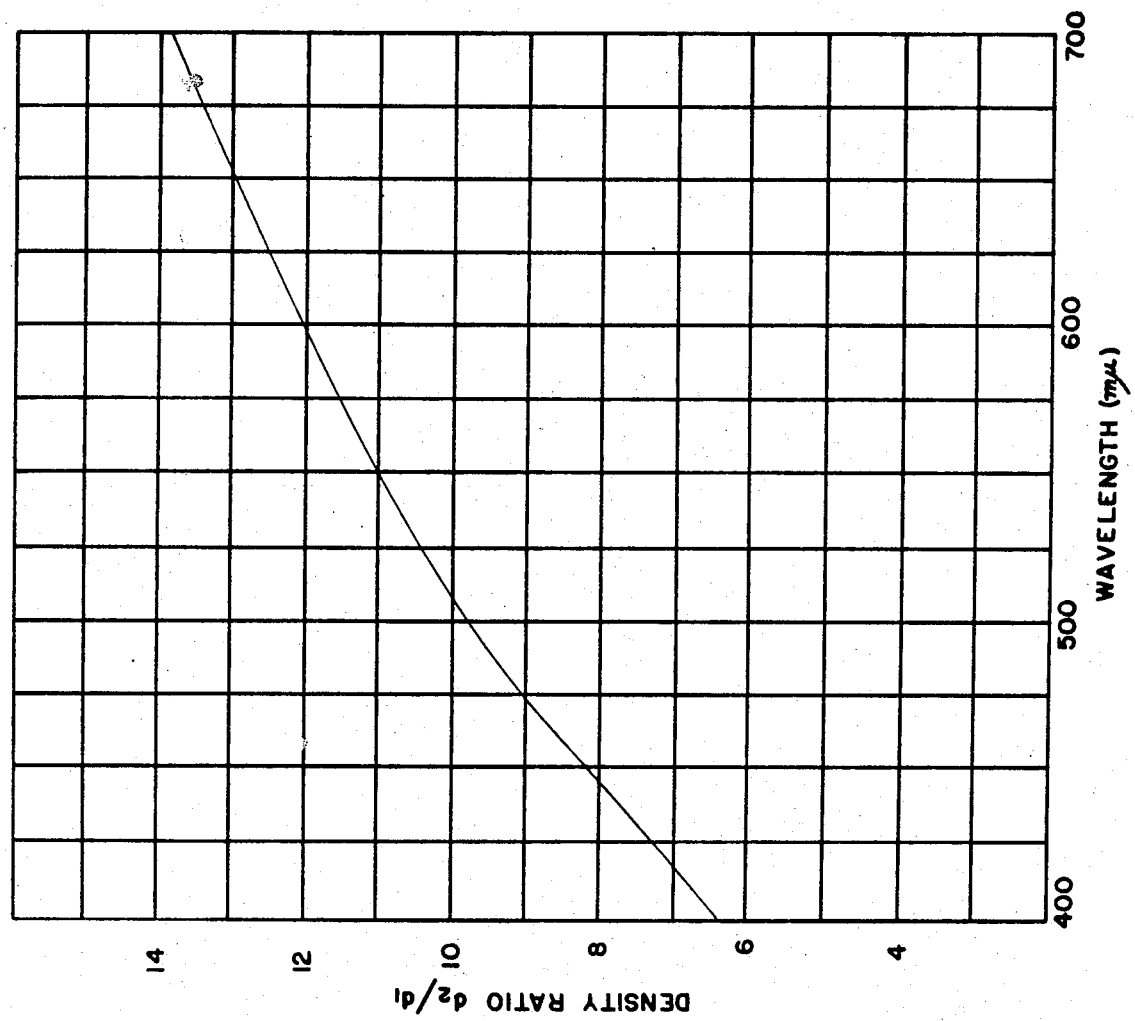

3,561,841
DIFFUSING LIGHT POLARIZERS
Kestutis Norvaisa, Concord, and Richard F. Wright, Acton, Mass., assignors to Polaroid Corporation, Cambridge, Mass., a corporation of Delaware
Filed Sept. 16, 1968, Ser. No. 762,211
Int. Cl. G02b 5/30
U.S. Cl. 350—157    11 Claims

ABSTRACT OF THE DISCLOSURE

Highly efficient diffusing light polarizers of a new type are described. The new diffusing light polarizers comprise an oriented suspension of doubly refracting, i.e., birefringent, crystallites of an organic high polymer within an amorphous, noncrystalline, substantially uniaxial, birefringent film of said polymer. These diffusing light polarizers transmit a specular beam and a diffuse beam polarized in the same plane.

---

Figure 1:
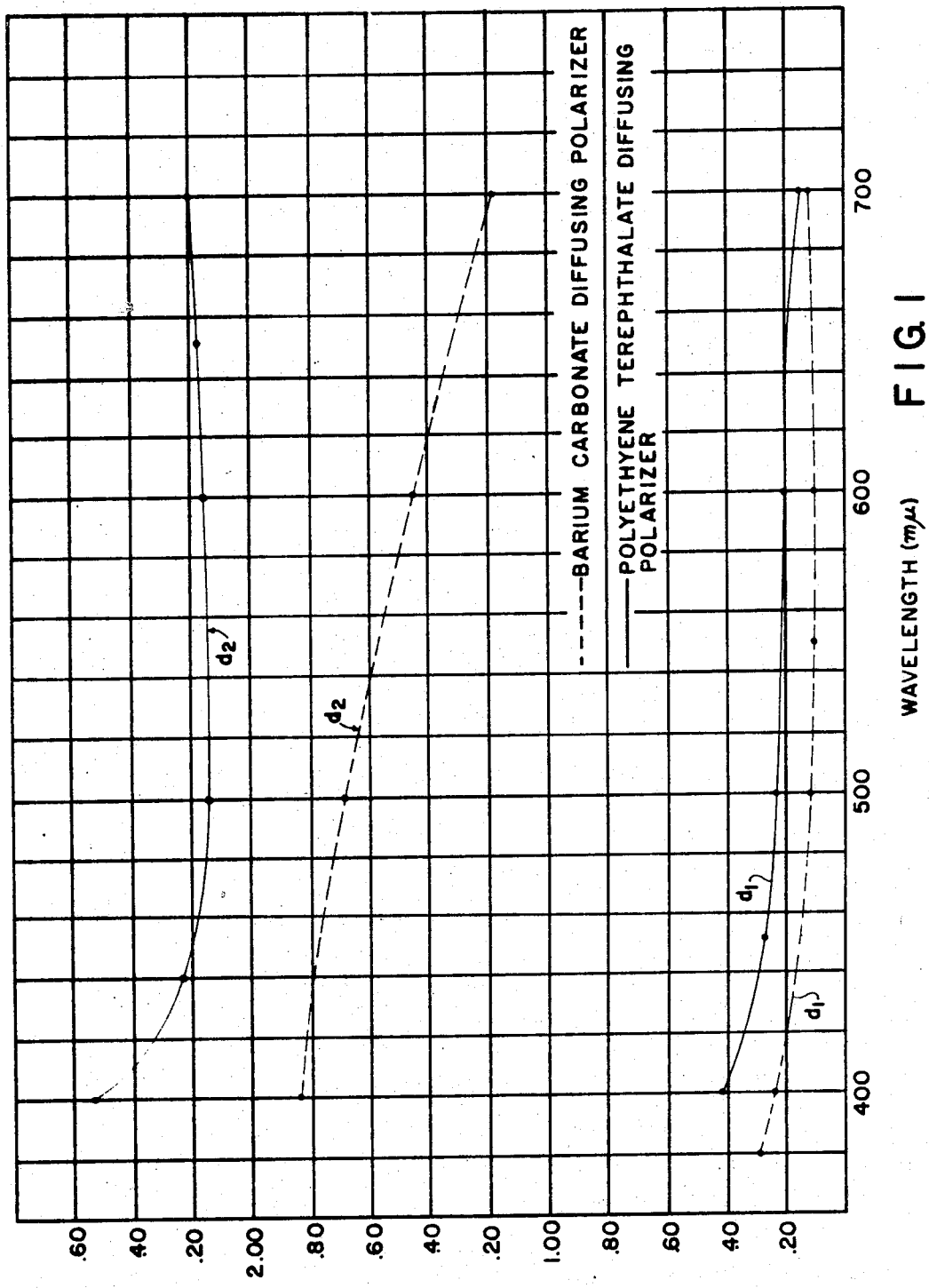

This invention relates to a new and improved light polarizer, and more particularly is concerned with providing new and more efficient diffusing light polarizers.

It has frequently been found desirable to provide means for simultaneously polarizing and diffusing a beam of light. Thus, it is desirable to be able to provide a diffused plane-polarized beam in advertising displays, photoelectric devices, area illumination, photography, etc. One application of light polarizers in which a diffusing light polarizer would be particularly useful involves the control of glare from automobile headlights.

A number of patents have described light polarizers designed to resolve a beam of ordinary light into two components emerging from said polarizer as polarized beams with their planes of rotation at substantially right angles to each other, one of said beams emerging as a diffused beam. See, for example, U.S. Pats. Nos. 2,122,178, 2,123,901, 2,123,902 and 2,246,087. Such diffusing light polarizers generally may be said to utilize the principle of selective light scattering and to comprise a light transmitting suspending medium having dispersed and embedded therein a mass of doubly refracting particles, said particles being oriented to substantial parallelism. As disclosed in said patents, needle-like particles of a doubly refracting material, e.g., barium carbonate, are incorporated in a fluid mass of the suspending medium, said needle-like particles being oriented to substantial parallelism in the resulting film of the suspending medium. This orientation is usually effected by the application of mechanical force or tensile stress, as by mechanically stretching said film lengthwise. The stretched film is appropriately handle (or treated) so as to retain the oriented particles in their aligned relationship.

It has now been discovered that new and more efficient diffusing light polarizers may be obtained by providing an oriented suspension of doubly refracting, i.e., birefringent, crystallites of an organic high polymer within an amorphous, noncrystalline, substantially uniaxial, birefringent film of said polymer. It has been further discovered that such diffusing light polarizers may be readily prepared by subjecting to controlled heating a birefringent, highly stretched, substantially uniaxial, amorphous film of an organic high polymer which has an inherent tendency to crystallize. Where a birefringent, highly stretched, uniaxial film is formed of a polymer which will readily crystallize, e.g., polyethylene terephthalate, heating above the crystallization temperature of the polymer, with the heat being applied in a controlled manner, will cause the formation of a multitude of crystallites or crystals of the polymer suspended within an amorphous mass of the same polymer. Furthermore, the high internal stress within the film will cause the crystals to be aligned or oriented to a very high degree of parallelism. The crystallites formed within the amorphous film effect diffraction, the film becoming milky white and appearing white and substantially opaque when viewed by reflected nonpolarized light. The resulting film has been found to be a very efficient diffusing light polarizer. A characteristic of the diffusing light polarizers of this invention is that two transmitted beams are polarized in the same plane, although one is specular and the other is diffused.

Referring to the drawings, FIGS. 1 and 2 are graphs of density against wavelength for the two components of a beam of light transmitted by a prior art diffusing polarizer and by diffusing polarizers of this invention, and FIG. 3 is a graph plotting the density ratio against wavelength for the diffusing polarizer of this invention referred to in FIG. 2.

A particularly useful polymer for practicing this invention is a polyester, e.g., polyethylene terephthalate. Films of polyethylene terephthalate are commercially available from a number of sources; particularly good results have been obtained with films of this polymer sold under the trademark "Mylar" by E. I. du Pont de Nemours & Co., Wilmington, Del. Commercially available films of polyethylene terephthalate are inherently more or less biaxial as a consequence of the standard methods of fabrication, although it is possible to cast polyethylene terephthalate films in such a manner that at least a widthwise portion is substantially uniaxial as cast. Biaxial films may be rendered substantially uniaxial by stretching techniques, as is well known in the art. As used herein, "uniaxial" and "substantially uniaxial" films are intended to describe films initially uniaxial or whose biaxial character has been so changed by stretching that the "2V angle" of the film is above 100°, the "2V angle" being calculated from the equation $$\cos^2 V_x = \frac{(N_z)^2}{(N_y)^2} \times \frac{[(N_y)^2 - (N_x)^2]}{[(N_z)^2 - (N_x)^2]}$$

wherein $N_x$, $N_y$ and $N_z$ are the refractive indices of the film in the $x$, $y$ and $z$ planes.

Crystallization is not dependent per se upon the orientation or non-orientation of the film, although orientation may encourage crystallization. Thus, biaxial films, e.g., polyethylene terephthalate, will also exhibit crystal formation (as evidenced by the appearance of hazy areas) when heated under appropriate conditions. [See, for example, "Structure and Properties of Oriented Poly(ethylene terephthalate) Films," Heffelfinger and Schmidt, Journal of Applied Polymer Science, Vol. 9, pp. 2661–2680 (1965).] The resulting polyethylene terephthalate film, however, will not exhibit light polarization to any significant extent, if at all, even though the film is birefringent. This failure to exhibit light polarization is due to the fact that the "2V angle" of a biaxial film is too small. The 2V angle in a positive birefringent film is the angle between the two optic axes in the X–Z plane; a "perfect" biaxial film would have a 2V angle of 90°. It has been found that films having a 2V angle of at least about 100° are sufficiently uniaxial to form useful diffusing light polarizers in accordance with this invention. Films having larger 2V angles yield more efficient diffusing light polarizers. Uniaxial films having a 2V angle of about 130–140° will provide extremely effective diffusing light polarizers which are particularly useful in controlling automobile headlight glare.

The thickness of the uniaxial film may vary considerably, useful diffusing light polarizers having been prepared from uniaxial polyethylene terephthalate films having thicknesses as low as 6 mils and as thick as 27 mils. The scattering efficiency of the final diffusing light polarizer is a function of the depthwise density, i.e., number of scattering centers or crystallites, and thicker films permit more crystallites to be present depthwise per unit area. Accordingly, one skilled in the art will be able to readily determine a film thickness range appropriate to the intended use of the diffusing light polarizers of this invention. The unheated uniaxial film should be haze free.

As indicated above, uniaxial films of polyethylene terephthalate are particularly useful in forming diffusing light polarizers in accordance with this invention. Accordingly, the following description of this invention will be in terms of the use of such uniaxial polyethylene terephthalate, but reference to this particular polymer should not be interpreted in a limiting sense since other polymers meeting the requisite conditions may also be used.

As noted above, the controlled application of heat has been found to crystallize the polyethylene terephthalate in the form of needle-like or plate-like crystallites oriented within a uniaxial amorphous film of polyethylene terephthalate. The particular method of heating is not critical, so long as the film temperature is raised reasonably uniformly, and preheating to a temperature below the crystallization time may be used to reduce the dwell time at high temperatures. The specific temperature of the oven within which the film is heated does not appear to be critical per se, provided that it is high enough to induce the desired crystallization. It will be recognized, however, that the over temperature and the length of time during which heat is applied to the film should be coordinated to provide practical combinations thereof, so that the polarizers may be manufactured in a rapid and economical manner. The oven temperature per se will be above the crystallization point and may be above the melting point of the polymer provided the dwell time is sufficiently short that the polymer itself is not heated above the melting point and the polymer film does not blister or char. Temperatures at the lower end of the heating range require relatively long dwell times within the heat zone, while temperatures at the high end may require such short dwell times as to be difficult to handle. The dwell time is preferably about 1 to 2 minutes, and oven temperatures of 500 to 800° F. have been found to be particularly effective. The heat may be applied to one planar surface of the film, or it may be applied to both of the planar surfaces simultaneously or sequentially. Applying heat to both surfaces provides a means of increasing crystallite density and of distributing that density more uniformly through the film thickness. The speed with which the temperature of the film is quenched, after crystallization has been initiated, may be varied to control the amount of crystallization in a reproducible manner.

The polyethylene terephthalate film must be held tautly during the heating step. Thus the film being heated may be clamped in a "ring" or other shape-retaining means or the film may be passed rapidly through a heating zone of appropriate dimensions to provide the desired dwell time and temperature. If the film is not held in a shape-retaining means during heating, other means of applying tension along the orientation axis of the film during heating should be employed to prevent relaxation or shrinkage which would reduce orientation.

The following examples of the formation of diffusing light polarizers in accordance with this invention are given for purposes of illustration only and are not intended to be limiting in any manner.

EXAMPLE 1

A 27 mil thick sheet of birefringent, amorphous, uniaxial polyethylene terephthalate (2V angle about 138°) was clamped in a 2½ inch diameter steel ring. A muffle furnace (heating coils covered by fire brick) was heated to 400–500° C. The furnace door was opened and the steel ring placed inside the furnace with the door partly open to permit continuous visual observation of the film. As the sample heated up, the center first turned hazy, then opaque and finally melted, and a hole was formed as the surrounding film started to contract. At this point (1 to 2 minutes after the film was placed in the furnace), the reaction was stopped by removing the sample and air cooling. Three distinct zones were noted. The center area surrounding the hole was a clear fused isotropic mass of polyethylene terephthalate. An opaque zone was present between this fused area and the perimeter of the sample. This opaque area when viewed through a dichroic linear light polarizer was crystal clear across the stretch axis but completely opaque along the stretch axis. A clear zone was observed between the opaque zone and the steel ring (which had never approached the temperature of the film in view of the short dwell time). This clear zone was found to be crystal clear in both components and exhibited double refraction.

EXAMPLE 2

The procedure described in Example 1 was repeated using a rotating table to obtain more uniform heating of the sample (the furnace door being partly open caused a front-to-back variation of the temperature within the furnace, but this variation was not sufficient to reduce the temperature below the polymer's crystallization point within the dwell time). The sample was removed after about 5 to 10 seconds, the center portion having turned a milky white, and dropped into tap water to rapidly quench the reaction within the film. Examination of the milky white area through a light polarizer showed it to be a good diffusing light polarizer.

For comparison purposes, commercially available biaxial films of polyethylene terephthalate (designated by E. I. du Pont de Nemours & Co., Wilmington, Del., as "D Type" and "T Type" Mylar films) were processed by the same procedure. Hazy areas were formed in each such film, but these areas exhibited no noticeable light polarization when viewed through a dichroic linear light polarizer.

EXAMPLE 3

The procedure described in Example 2 was repeated using a 6 mil film of uniaxial birefringent polyethylene terephthalate (2V angle about 131°). An effective diffusing light polarizer was again obtained, but of somewhat lower crystallite density as a result of the initial film being appreciably thinner.

EXAMPLE 4

A 27 mil thick, 1.5 inch wide film of uniaxial birefringent polyethylene terephthalate (2V angle about 138°) held in a linear stretcher with no transverse constraints was passed in a continuous manner through a hot zone having an air temperature of about 550° F. (The hot zone was provided by inverting one hot plate above another, the respective faces being about 2 inches apart.) The rate at which the film was advanced under tension was controlled to provide a dwell time in the hot zone of about 1 minute. The resulting milky white film area was found to be a very good diffusing light polarizer. Examination of the film showed that it had "necked down" about 3/16 inch in width as a result of this treatment.

EXAMPLE 5

The procedure described in Example 2 was repeated employing a uniaxial birefringent film of polyethylene terephthalate having a 2V angle of about 115°. A good diffusing light polarizer was again obtained, but it was somewhat less efficient than that obtained in Example 2.

EXAMPLE 6

The optical characteristics of an edge portion of a diffusing polarizer prepared in a manner similar to that described in Example 4 were studied by running spectrally limited curves on said experimental diffusing polarizer in a Cary 14 Spectrophotometer using a HNP'B filter as the analyzer and the photometric sphere as the receiver element. (The HNP'B filter is a modified "H" type polyvinyl alcohol iodine dichroic linear polarizes which effectively polarized radiation between 275–750 mµ.) The intensities of (a) the specular transmittance, (b) the specular back reflectance, (c) the total forward transmittance and (d) the total back reflectance of the experimental diffusing polarizer were measured in polarized light successively oriented in "crossed" and "parallel" setting with respect to the orienting axis of the experimental diffusing polarizer. On the basis of data so obtained at three selected wavelengths, the following reflectances (R) and transmittances (T), where the specular components $$(S_{\parallel}, S_{\perp})$$

are as read and the diffuse components $$(D_{\parallel}, D_{\perp})$$

are determined for the whole sphere reception (i.e., total angular scatter), were assigned:

|  | 500 mµ. | 600 mµ. | 700 mµ. |  |
|---|---|---|---|---|
| T ($S_{\parallel}$) (calc.) | 0.52 | 0.587 | 0.633 | Specular. |
| T ($S_{\perp}$) (calc.) | 0 | 0 | 0 | Do. |
| R ($S_{\parallel}$) | 0.05 | 0.05 | 0.05 | Do. |
| R ($S_{\perp}$) | 0.04 | 0.04 | 0.03 | Do. |
| T ($D_{\parallel}$) | 0.200 | 0.163 | 0.137 | Diffuse. |
| T ($D_{\perp}$) | 0.258 | 0.310 | 0.347 | Do. |
| R ($D_{\parallel}$) | 0.098 | 0.073 | 0.063 | Do. |
| R ($D_{\perp}$) | 0.342 | 0.337 | 0.326 | Do. |

This data demonstrates (a) the specular components show high polarizance (i.e., about 100%) in transmittance, and a surface reflectance only in back reflectance; (b) the forward diffuse radiation shows a polarizance of 12.5% to 43.5% with this advantage favoring the orientation of the specular beam forward; (c) the back diffuse radiation shows a polarizance of 55.5% to 68.5% favoring the opposing orientation.

EXAMPLE 7

The procedure described in Example 2 was repeated using uniaxial birefringent polyethylene terephthalate films 18 mil thick (2V angle about 104°), 16 mil thick (2V angle about 137°), 23 mil thick (2V angle about 127°) and 9 mil thick (2V angle about 100°). In each instance the resulting milky white film exhibted useful diffusing polarization, with the diffusing polarizer effectiveness being greatest with larger 2V angles and higher density of crystallite light scattering centers.

EXAMPLE 8

A 27 mil thick sheet of birefringent, amorphous uniaxial polyethylene terephthalate (2V angle about 138°) was clamped in a rotating ring holder. Heating coils exposed to the inner chamber of a furnace were heated to radiant heat with the furnace door left open for visual monitoring. The film sample was preheated for about a minute by alternately entering and removing the film sample from the radiant heat zone before it could reach the crystallization temperature. After the sample was hot, it was inserted in the radiant heat zone with one film surface facing the red hot heating coils so as to be heated by radiant heat. Crystallization immediately followed and the sample was quickly removed and quenched. The resulting diffusing polarizer exhibited very good $d_1$ and $d_2$.

EXAMPLE 9

The procedure described in Example 8 was repeated except that both surfaces of the film sample were heated facing the red hot heating coils. Crystal growth occurred immediately and the sample was removed and quenched before surface charring could occur. Heating both surfaces of the film increased the concentration of crystallites and gave a better $d_1$ and a higher $d_2$ value than the diffusing polarizer prepared in Example 8.

EXAMPLE 10

A diffusing polarizer prepared as in Example 2 was externally mounted approximately 3 inches from the filament of a 150-watt automobile headlamp. No changes in $d_1$ or $d_2$ or evidence of charring were observed after 30 minutes of exposing the polarizer to the heat from the headlamp in still air at an air temperature at 30 to 35° F. A road test showed that the diffusing polarizer quite effectively controlled glare from the headlamps of an approaching automobile so equipped.

Photomicrographs of cross-sections of the diffusing light polarizers prepared in the above examples confirmed the presence of oriented crystallites, the light-scattering effect of these crystallites apparently being responsible for the white or milky white visual appearance of the polarizer. Electron microscope images suggest that the crystallites are plate-like whereas light microscope studies suggest that the crystallites are needle-like; the respective magnifications are such that the suggestions are not necessarily inconsistent, since the platelets could be so arranged as to form "strings" or needle-like arrays. A study of the projected light pattern from these films showed cylindrical light scattering, further evidencing a needle-like character of the crystallites. In applications of these diffusing light polarizers to automobile headlight glare control, such cylindrical light scattering may be objectionable. Accordingly, in such applications, it is preferred to mount the diffusing polarizer with its stretch or needle axis in a vertical plane so the scattering then will be horizontal in nature with minimal light directed upwards, and to use a half wave plate to rotate the plane of polarization of the transmitted light to 45°, the preferred plane for glare control in night driving. Alternately, a quarter wave plate may be used to convert the transmitted plane polarized light to circularly polarized light. In certain applications, it may be desirable to utilize a dichroic polarizer to increase the extinction of the unwanted component transmitted by the diffusing polarizer.

The diffusing polarizers of this invention are characterized by very low front scatter with almost all scattered light being reflected back towards the source. (This low front scatter greatly increases the effectiveness of these diffusing polarizers as part of an automobile headlight glare control system, for the brightness of an oncoming headlight will be reduced and minimal unwanted polarized light will pass through the windshield analyzer.) The light scattered forward is polarized in the same azimuth as the specular transmitted beam. The back-reflected light is polarized in the opposite azimuth, i.e., at a 90° angle, and is diffused. The diffusing light polarizers of this invention are the first known polarizers having two transmitted beams polarized in the same plane, one being specular and the other diffuse. (A third beam of diffuse light polarized at right angles may also be present.) In the most efficient forms, the transmitted light could approximate 99% specular and 1% diffuse. The transmitted specular beam constitutes approximately 40% of the incident unpolarized light. The polarizers of this invention constitute the first diffusing polarizers that reflect enough light to make it really practical to try and redirect such light forward in such a manner as to increase the total transmitted light polarized in a given plane, and doing this makes it possible to obtain more than 50% transmission of incident light. One structure which is effective to accomplish this objective incorporates a quarter wave plate positioned directly behind the diffusing polarizer, i.e., between the diffusing polarizer and a light source mounted within a parabolic polished reflector, to appropriately reverse the polarization of reflected light through the quarter wave plate to the reflector and back through the quarter wave plate; such structures are the subject of the commonly assigned copending application of Albert S. Makas, Ser. No. 762,280, filed concurrently herewith.

It is common practice to describe the optical properties of a light polarizer in terms of the "density ratio," i.e., the ratio of the minor and major principal densities $d_1$ and $d_2$, i.e., the absorption of the components of incident light vibrating in a plane perpendicular to the stretch axis and of the component vibrating in a plane parallel to the stretch axis:

$$R_d = \frac{d_{\parallel}}{d_{\perp}} \text{ or } \frac{d_2}{d_1}$$

$d_2$ being the extinction density. If the light polarizer is of the dichroic type it employs selective absorption to attenuate the incident light beam, and this ratio is termed the "dichroic ratio." The light polarizers of this invention do not employ selective absorption but a form of bireflectance to attenuate the incident light beam, the unwanted component being reflected instead of being absorbed as in a dichroic polarizer. Accordingly, "density ratio" is used here instead of the functionally analogous and more common expression "dichroic ratio."

As noted above, the diffusing light polarizers of this invention are substantially more efficient than those of the prior art. This superiority is evidenced by the curves reproduced in the drawings. For comparison purposes, a diffusing polarizer of barium carbonate needle crystals oriented in polyvinyl butyral (chosen to have an index of refraction matching the lower index of the doubly refracting barium carbonate crystals) was selected as representative of the most efficient prior art diffusing polarizers. FIG. 1 is a graph wherein density is plotted against wavelength in millimicrons for the two components parallel to the stretch axis $$(d_{\parallel})$$

and perpendicular to the stretch axis $$(d_{\perp})$$

of a beam of light transmitted by such a prior art barium carbonate diffusing polarizer and by a diffusing light polarizer of this invention prepared as described in Example 5. The density measurements were made on a Cary II Spectrophotometer with a Glan-Foucault analyzer.

FIG. 2 is a graph similar to FIG. 1 wherein the same comparison is made with a very efficient diffusing light polarizer of this invention prepared in accordance with the procedure described in Example 9. FIG. 3 is a graph plotting the density ratio against wavelength for the same new diffusing polarizer as compared in FIG. 2. FIG. 3 is of particular interest in demonstrating the effectiveness of the novel polyethylene terepthalate diffusing polarizer to function as a diffusing polarizer in the infrared; this property is to be distinguished from the infrared dichroism exhibited by oriented polyethylene terephthalate as an inherent property of its chemical structure and used to characterize the orientation of specific chemical groups.

As pointed out above, the novel diffusing polarizers of this invention are obtained by inducing controlled crystallization within an amorphous uniaxial birefringent film. The criterion for crystallization of a polymer is the geometric regularity of the molecular structure, but absolute geometric regularity is not necessary. Orientation of the film facilitates crystallization by increasing regularity. Typical crystallizable polymers are homopolymers or copolymers that are both chemically and geometrically regular in their structure, and they are usually prepared from straight-chain intermediates. The crystallization temperature appears to be related to the "relaxation transition" or "second-order transition" temperature, and may be considered to be the point at which, on raising the temperature, the specific heat and the coefficient of expansion of a glasslike polymer suddenly increase and the specimen becomes more flexible and somewhat rubberlike. There also appears to be a fairly sudden increase in molecular mobility. In the case of polyethylene terephthalate, the literature reports the crystalline polymer to be the trans form of the molecule and the amorphous material to be the gauche form of the polymer as a function of the configuration of the ethylene glycol linkages. Stretching of the amorphous polyethylene terephthalate film transforms the gauche form into the trans form which will more readily crystallize. Both forms may exist in the amorphous portions of the film, but only the trans isomer exists in the crystalline regions.

The uniaxial polyethylene terephthalate films employed in the above examples actually have three indices of refraction, but the two lower indices are so close together as to be essentially a single index. Thus the film used in Example 1 exhibited indices of refraction of 1.69, 1.54 and 1.53; for all practical purposes, this film can be considered to have only the two higher indices of refraction. An incident beam of nonpolarized light will be resolved into two components; the polarized component matching the lower index will be transmitted as a specular or substantially nondiffused beam while the other component matching the higher index will be transmitted as a polarized diffused or scattered beam. (For this reason, the lower index of refraction of the crystallites must match or approximate the average index of refraction of the amorphous region or both components will be scattered.) The scattered component is polarized at right angles to the specular component and is diffused cylindrically, i.e., in planes substantially at right angles to the direction or orientation of the needle axes of the suspended crystals. Thus, if the polarizing body is positioned so that the direction of orientation of the crystals is vertical, the diffused component will be spread or diffused horizontally.

In many of the commercial applications of diffusing light polarizers it is desirable that the diffusion of the non-specular component be as great as possible. Where the diffusing polarizer is used in connection with an automobile headlight in the elimination or reduction of automobile headlight glare, the specular component may be employed to form the hot spot of the projected beam. A cooperating plane light polarizer employed as a windshield visor of an approaching car may be adapted to block this specular component, thus transmitting only the diffused component. In the reduction of glare it is desirable that the diffusion of the diffused component be as great as possible, so that the amount transmitted through the polarizing visor of an approaching car be reduced to a minimum.

Since certain changes may be made in the above product and different embodiments of the invention could be made without departing from the scope thereof, it is intended that all matter contained in the above description or shown in the accompanying drawing shall be interpreted as illustrative and not in a limiting sense.

What is claimed is:

1. A diffusing light polarizer comprising an amorphous, birefrigent, substantially uniaxial body of an organic high polymer having a 2V angle of at least about 100° and a multitude of birefrigent crystals of said organic high polymer oriented and suspended within said body, the lower index of refraction of said crystals being substantially equal to the average index of refraction of said amorphous body.

2. A diffusing light polarizer comprising a light-transmitting, substantially uniaxial birefrigent, noncrystalline, amorphous polymeric film having a 2V angle of at least about 100° and a multitude of birefrigent needle-like crystallites of said polymer suspended within said film, said crystallites being oriented to substantial parallelism within said film, the lower index of refraction of said crystallites being substantially equal to the average index of refraction of said amorphous portion of said polymeric film.

3. A diffusing light polarizer as defined in claim 2, wherein said polymer is polyethylene terephthalate.

4. A diffusing light polarizer comprising an amorphous, birefrigent, substantially uniaxial mass of polyethylene terephthalate, said amorphous birefrigent mass of polyethylene terephthalate having a 2V angle of at least 100° and a multitude of birefrigent crystals of polyethylene terephthalate oriented and suspended within said mass, the lower index of refraction of said crystals being substantially equal to the average index of refraction of said amorphous mass.

5. A diffusing light polarizer as defined in claim 4, wherein said amorphous birefrigent mass of polyethylene terephthalate has a 2V angle of about 130 to 140°.

6. A method of forming a diffusing light polarizer comprising subjecting a substantially uniaxial, amorphous, birefrigent, polymeric film having a 2V angle of at least about 100° to a temperature above the crystallization point of said polymer for a period of time sufficient to cause said film to undergo crystallization and therefore become milky white, and rapidly quenching said heated film to provide an amorphous film having crystallites of said polymer oriented therewithin, said film being so secured during said heating and quenching as to substantially prevent any change in the orientation of said film.

7. A method as defined in claim 6, wherein said 2V angle is about 130 to 140°.

8. A method as defined in claim 6, wherein heat is applied first to one planar surface of said film and then to the opposite planar surface of said film.

9. A method of forming a diffusing light polarizer comprising subjecting a substantially uniaxial, birefrigent, amorphous film of polyethylene terephthalate having a 2V angle of at least about 100° to a temperature above the crystallization temperature for a period of time sufficient to form crystallites of said polymer within said amorphous film whereby the heated areas are caused to turn milky white, and thereafter cooling said film to quench the physical reactions induced by said heating, said film being so held during said heating as to cause the inherent tendency of said uniaxial film to shrink to assist the orientation of the crystallites of polyethylene terephthalate formed by said heating.

10. A method as defined in claim 9, wherein said film is subjected to an additional linear stretch during said heating.

11. The method of polarizing and diffusing visible light comprising directing said light through a diffusing polarizer which comprises an amorphous, birefrigent, substantially uniaxial body of an organic high polymer having a 2V angle of at least about 100° and a multitude of birefrigent crystals of said organic high polymer oriented and suspended within said body, the lower index of refraction of said crystals being substantially equal to the average index of refraction of said amorphous body.

References Cited

UNITED STATES PATENTS

| | | | |
|---|---|---|---|
| 2,270,535 | 1/1942 | Land et al. | 350—157X |
| 2,604,817 | 7/1952 | Schupp et al. | 350—157 |
| 2,887,566 | 5/1959 | Marks | 350—157X |
| 3,205,775 | 9/1965 | Marks | 350—155 |
| 3,350,982 | 11/1967 | Marks | 350—154X |

OTHER REFERENCES

Heffelfinger et al., "X-Ray Determination of the Crystallite Orientations Distributions of Polyethylene Terephthalate Films," J. Polymer Science vol. XLVII (1960), pp. 289–306.

Heffelfinger et al. "Structure and Properties of Oriented Poly(ethylene Terephthalate) Films," J. App. Polymer Science vol. 9, (1965), pp. 2661–2680.

DAVID SCHONBERG, Primary Examiner

P. R. MILLER, Assistant Examiner

U.S. Cl. X.R.

350—147, 154, 156